(12) United States Patent
Borenstein

(10) Patent No.: US 9,628,297 B2
(45) Date of Patent: Apr. 18, 2017

(54) COMMUNICATION AUTHENTICATION USING MULTIPLE COMMUNICATION MEDIA

(75) Inventor: Nathaniel S. Borenstein, Southfield, MI (US)

(73) Assignee: International Business Machines Corporation, Armonk, NY (US)

( * ) Notice: Subject to any disclaimer, the term of this patent is extended or adjusted under 35 U.S.C. 154(b) by 2161 days.

(21) Appl. No.: 12/428,649

(22) Filed: Apr. 23, 2009

(65) Prior Publication Data
US 2010/0275245 A1 Oct. 28, 2010

(51) Int. Cl.
H04L 29/06 (2006.01)
H04L 12/58 (2006.01)
G06F 21/31 (2013.01)

(52) U.S. Cl.
CPC ............ H04L 12/585 (2013.01); G06F 21/31 (2013.01); H04L 51/12 (2013.01)

(58) Field of Classification Search
CPC ........ G06F 21/31; H04L 12/585; H04L 51/12
USPC .......................................... 709/206; 726/4–6
See application file for complete search history.

(56) References Cited

U.S. PATENT DOCUMENTS

| 6,343,311 | B1 * | 1/2002 | Nishida et al. ............... 709/203 |
| 6,996,800 | B2 | 2/2006 | Lucassen et al. |
| 7,028,306 | B2 | 4/2006 | Boloker et al. |
| 7,036,128 | B1 | 4/2006 | Julia et al. |
| 8,185,936 | B1 * | 5/2012 | Reeves et al. .................... 726/5 |
| 8,325,893 | B2 * | 12/2012 | Vendrow ........................ 379/189 |
| 2004/0015554 | A1 * | 1/2004 | Wilson .......................... 709/206 |
| 2004/0024817 | A1 * | 2/2004 | Pinkas .......................... 709/203 |
| 2007/0106557 | A1 * | 5/2007 | Varghese ........................ 705/14 |
| 2007/0165821 | A1 * | 7/2007 | Altberg et al. .......... 379/210.02 |
| 2008/0127311 | A1 * | 5/2008 | Yasaki et al. ..................... 726/4 |
| 2008/0207190 | A1 * | 8/2008 | Altberg et al. ............. 455/422.1 |
| 2008/0244021 | A1 * | 10/2008 | Fang ........................... 709/206 |
| 2009/0037734 | A1 * | 2/2009 | Kito ............................. 713/168 |
| 2009/0113530 | A1 * | 4/2009 | Brainard et al. .................. 726/6 |

(Continued)

FOREIGN PATENT DOCUMENTS

EP 1143679 A2 10/2001

OTHER PUBLICATIONS

A VoIP anti-Spam System based on Reverse Turing Test, Wang, Ting, Thesis, North Carolina State University, 2007, 148 pages.*

(Continued)

*Primary Examiner* — Mohammad A Siddiqi
(74) *Attorney, Agent, or Firm* — Edward Choi; Hoffman Warnick LLC

(57) ABSTRACT

The invention provides a method, system, and program product for authenticating a first individual for communication with a second individual. In one embodiment, the invention includes receiving a first communication from the first individual via a first communication medium, rejecting the first communication, providing the first individual with information for communicating with the second individual via a second communication medium, receiving a second communication from the first individual via the second communication medium, and authenticating the first individual for communication with the second individual via at least one of the first and second communication medium.

20 Claims, 5 Drawing Sheets

(56) References Cited

U.S. PATENT DOCUMENTS

2009/0119754 A1\* 5/2009 Schubert ............................ 726/4
2012/0039452 A1\* 2/2012 Horn et al. ................... 379/188

OTHER PUBLICATIONS

Coles et al., "A Framework for Coordinated Multi-Modal Browsing with Multiple Clients", May 2003, pp. 718-726, WWW 2003, Budapest, Hungary.
Setlock et al., "Taking it Out of Context: Collaborating Within and Across Cultures in Face-to-Face Settings and via Instant Messaging", Nov. 2004, pp. 604-613, CSCW 2004, Chicago, IL, USA.

\* cited by examiner

COMMUNICATION AUTHENTICATION USING MULTIPLE COMMUNICATION MEDIA

FIELD OF THE INVENTION

The invention relates generally to communications and, more particularly, to the authentication of a communicant using a plurality of communication media.

BACKGROUND OF THE INVENTION

Today, it is common for individuals to communicate via a number of media. For example, two people may frequently communicate via electronic mail, instant messaging, and voice-over-Internet protocol (VOIP) telephony. At the same time, spam and other malware has increased not only in absolute amount, but in the number of media involved.

As such, it has become more important to be certain that a communication is not only originating from a legitimate or reliable source, but that the source is, in fact, a human rather than a computer or other non-human source. Universal authentication systems exist that enable "reputation" or source information to be shared across modalities, but these employ authenticated, and often proprietary, directory services with which communicants must pre-authenticate. Thus, such systems do not permit reputation or source information to be shared where, for example, a non-authenticated communicant initiates a communication.

Accordingly, there exists a need in the art to overcome the deficiencies and limitations described hereinabove.

SUMMARY OF THE INVENTION

The invention provides a method, system, and program product for authenticating a first individual for communication with a second individual.

A first aspect of the invention provides a method of authenticating a first individual for communication with a second individual, the method comprising: receiving a first communication from the first individual via a first communication medium; rejecting the first communication; providing the first individual with information for communicating with the second individual via a second communication medium; receiving a second communication from the first individual via the second communication medium; and authenticating the first individual for communication with the second individual via at least one of the first and second communication medium.

A second aspect of the invention provides a system for authenticating a first individual for communication with a second individual, the system comprising: a system for receiving a first communication from the first individual via a first communication medium; a system for rejecting the first communication; a system for providing the first individual with information for communicating with the second individual via a second communication medium; a system for receiving a second communication from the first individual via the second communication medium; and a system for authenticating the first individual for communication with the second individual via at least one of the first and second communication medium.

A third aspect of the invention provides a program product stored on a computer-readable medium, which when executed, authenticates a first individual for communication with a second individual, the program product comprising: program code for receiving a first communication from the first individual via a first communication medium; program code for rejecting the first communication; program code for providing the first individual with information for communicating with the second individual via a second communication medium; program code for receiving a second communication from the first individual via the second communication medium; and program code for authenticating the first individual for communication with the second individual via at least one of the first and second communication medium.

A fourth aspect of the invention provides a method for deploying an application for authenticating a first individual for communication with a second individual, comprising: providing a computer infrastructure being operable to: receive a first communication from the first individual via a first communication medium; reject the first communication; provide the first individual with information for communicating with the second individual via a second communication medium; receive a second communication from the first individual via the second communication medium; and authenticate the first individual for communication with the second individual via at least one of the first and second communication medium.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
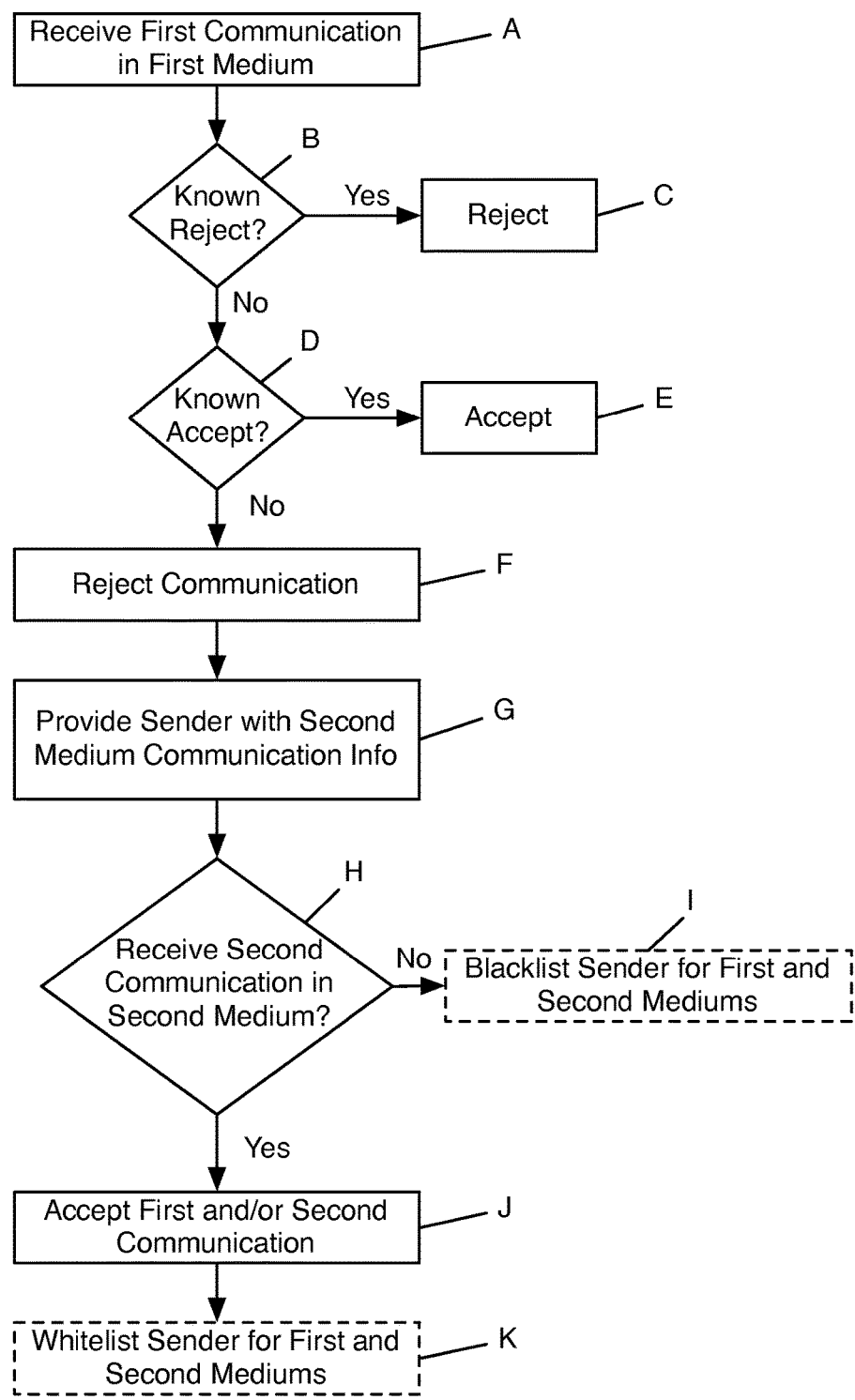
FIG. 1 shows a flow diagram of an illustrative method according to the invention.

Turning now to the drawings, FIG. 1 shows a flow diagram of an illustrative method according to the invention. At A, a first communication is received via a first communication medium. Such communication medium may be, for example, electronic mail, telephony, voice-over-Internet-protocol (VOIP) telephony, instant messaging (IM), social network messaging, or any other known or later-developed communication medium. For purposes of illustration only, FIG. 1 will be described as though the first communication medium is electronic mail.

At B, it is determined whether the first communication should be rejected as having an unreliable source or content that may be harmful, offensive, or otherwise undesirable. That is, the determination whether to reject the first communication may be based on either or both of the identity of the sender or the content of the communication. Such determination may be made in a manner similar to known spam filters, including the use of "blacklisted" sources or messages. If it is determined that the first communication should be rejected (i.e., Yes at B), the first communication is so rejected at C and no further processing of the communication is made.

If it is determined that the first communication should not be rejected (i.e., No at B), it is determined, at D, whether the first communication should be accepted as having a reliable source or content known to be acceptable. That is, as with the determination whether to reject at B, the determination whether to accept the first communication at D may be based on either or both of the identity of the sender or the content of the communication. For example, if the sender is a known or previous correspondent or the communication itself includes something by which the authenticity and/or safety of the communication may be verified, such as with a digital certificate, it may be determined at D that the first communication should be accepted. If so (i.e., Yes at D), the first communication is accepted at E and no further processing of the communication is made. If, however, it is determined at B and D that the first communication should not be outright rejected or accepted, respectively (i.e., No at both B and D), the first communication is rejected at F and further processed, as described below.

At G, the sender of the first communication is provided with information regarding how to contact the recipient using a second communication medium. The second communication medium may be any known or later-developed communication other than that by which the first communication was sent. For purposes of illustration only, the second communication medium will described here as VOIP telephony. By providing the sender with information enabling the sender to contact the recipient using a different communication medium, communications from non-human sources, such as a computer or artificial intelligence (AI) robot, may effectively be rejected. That is, a computer or AI robot is unlikely to be able to make use of such information and, therefore, unlikely to actually make contact with the recipient via the second communication medium.

At H, it is determined whether a second communication is received from the sender using the second communication medium. Such determination may include a temporal component, such as requiring the second communication to be received within one hour or some other time limit. If a second communication is not received (i.e., No at H), the sender of the first communication may optionally be "blacklisted" for one or both of the first and second communication mediums. That is, the sender may be added to a list of sources known to be unreliable such that all future communications from the sender will be rejected outright, as at C, above. Optionally, the sender may be blacklisted for all communication mediums.

If a second communication is received from the sender (i.e., Yes at H), one or both of the first and second communications may be accepted at J. Optionally, at K, the sender may thereafter be "whitelisted" for one or both of the first and second communication mediums. That is, the sender may be added to a list of sources known to be reliable such that all future communications from the sender will be automatically accepted, as at E, above. Optionally, the sender may be whitelisted for all communication mediums.

Figure 2:
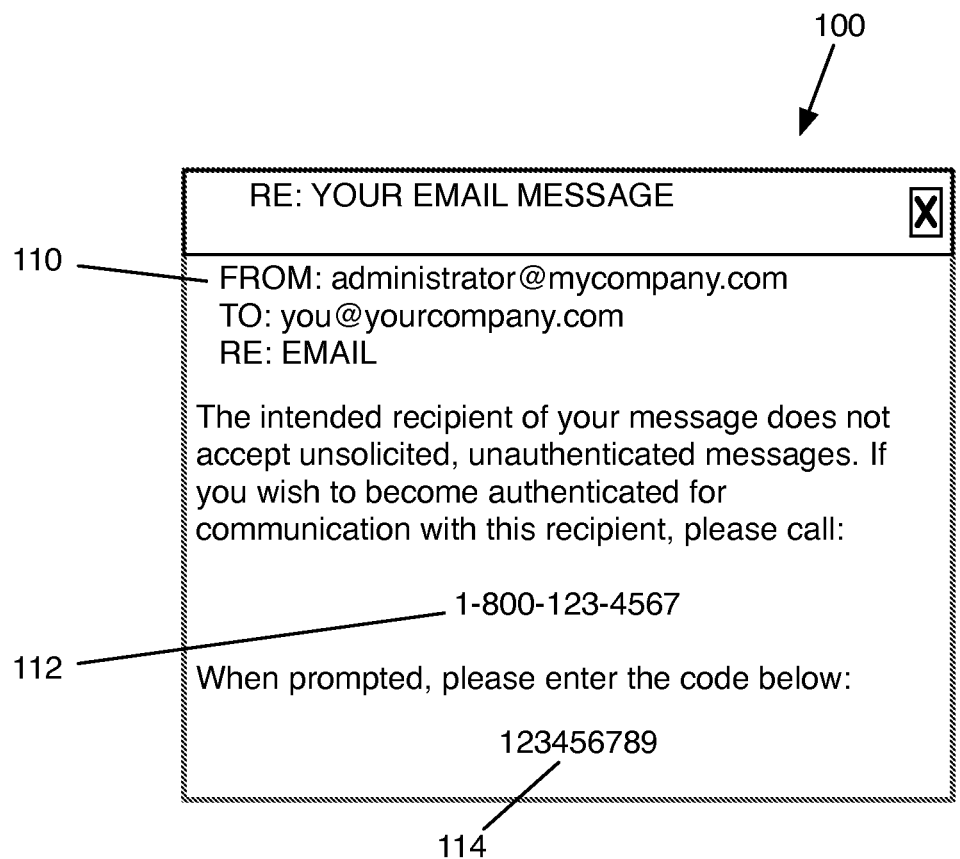
FIGS. 2-4 show examples of information provided to a first individual regarding how the second individual may be contacted using a second communication medium.

FIG. 2 shows an illustrative electronic mail message 100 containing information for contacting the recipient using a second communication medium, as may be provided to a sender at G of FIG. 1. The electronic mail message 100 will generally contain transactional information 110, such as to whom and from whom the message is sent. In addition, the electronic mail message 100 will contain second communication medium information 112 (here, a phone number by which the sender may contact the recipient) and information comprising a reverse Turing test (here, a requirement to enter a specific code 114 when contacting the recipient using the second communication system).

A reverse Turing test is designed to permit a distinction to be made between a human and a non-human (typically a computer or machine) with whom one is in communication. Ideally, therefore, as it relates to the present invention, a reverse Turing test is one that can be passed by all humans and by no non-humans. Using the example in FIG. 2, in order to pass the reverse Turing test and be authenticated for communication with the recipient, one must read the electronic mail message 100, call the recipient at the number provided in the second communication medium information 112, and, when prompted, enter the code 114 provided. This is something that most humans can do successfully (assuming, of course, that they are able to read and understand the language in which the second communication medium information 112 and code 114 are written). On the other hand, a non-human sender (e.g., a computer) is unlikely to be able to discern from the electronic mail message 100 the exact steps to be taken to become authenticated for communication with the recipient.

Figure 3:
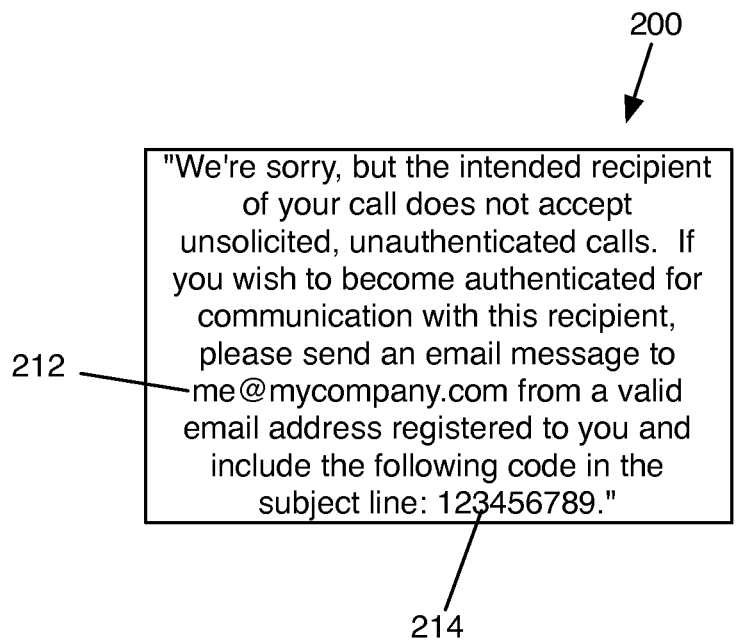

The electronic mail message 100 in FIG. 2 is, of course, just one example of the information regarding a second communication medium that may be provided to a sender. For example, FIG. 3 shows an illustrative script 200 of a message that may be delivered to a sender who attempts to contact a recipient by telephone or VOIP telephony. As in FIG. 1, the script 200 includes second communication medium information 112 (an electronic mail message to which the sender must send an electronic mail message) and a code 214 that the sender must include in a new communication sent using the second communication medium.

Figure 4:
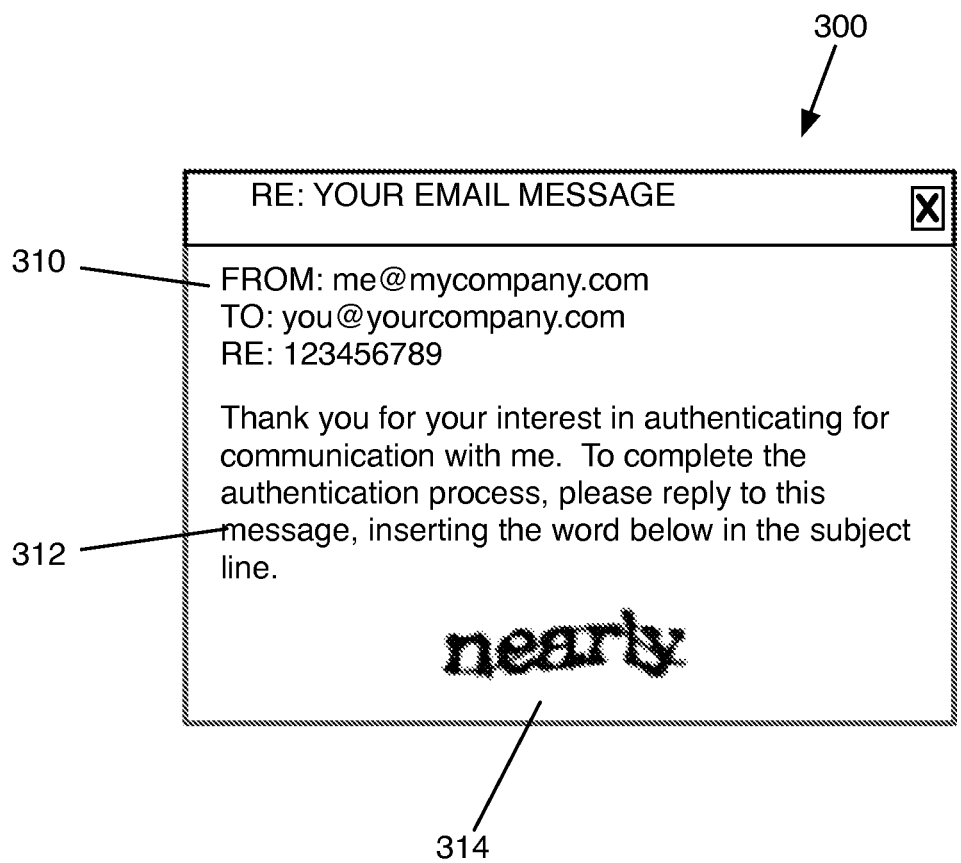

In some embodiments of the invention, the reverse Turing test may comprise a CAPTCHA (Completely Automated Public Turing test to tell Computers and Humans Apart). For example, FIG. 4 shows an electronic mail message 300 that may be delivered to a sender who sends a proper email message in response to the script 200 in FIG. 3. Rather than a code, electronic mail message 300 includes a CAPTCHA 314 in the form of an image of a partially obscured or distorted piece of text (here, the word "nearly"). Most humans can decipher the underlying text in the CAPTCHA 314, while most computer programs, including those employing optical character recognition (OCR) cannot. Thus, in the example shown in FIG. 4, the CAPTCHA 314 serves as a reverse Turing test.

Figure 5:
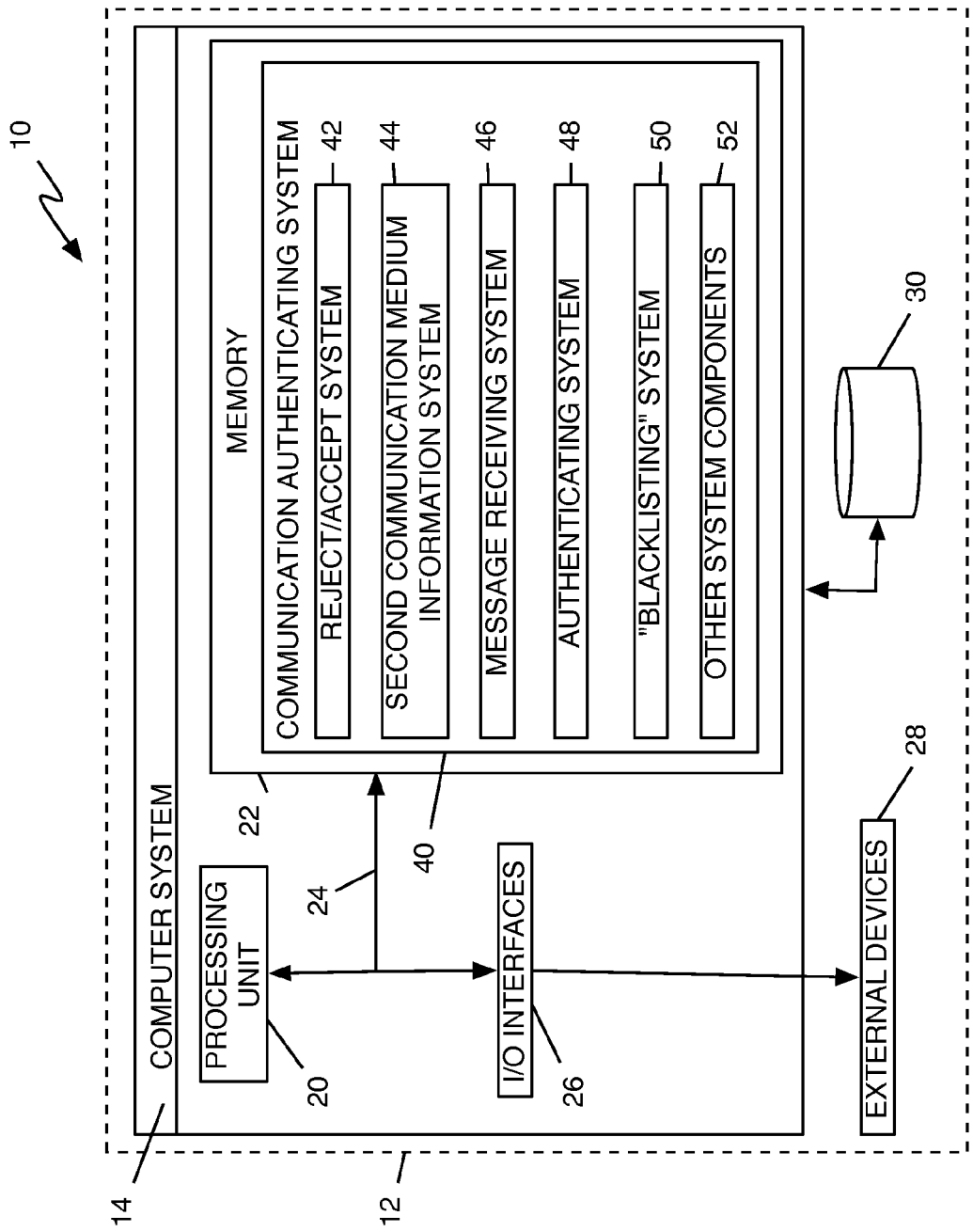
FIG. 5 shows a block diagram of an illustrative system according to the invention.

FIG. 5 shows an illustrative system 10 for authenticating a first individual for communication with a second individual. To this extent, system 10 includes a computer infrastructure 12 that can perform the various process steps described herein for authenticating a first individual for communication with a second individual. In particular, computer infrastructure 12 is shown including a computer system 14 that comprises an communication authenticating system 40, which enables computer system 14 to authenticate a first individual for communication with a second individual by performing the process steps of the invention.

Computer system 14 is shown including a processing unit 20, a memory 22, input/output (I/O) interfaces 26, and a bus 24. Further, computer system 14 is shown in communication with external devices 28 and a storage system 30. As is known in the art, in general, processing unit 20 executes computer program code, such as communication authenticating system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and communication authenticating system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, the communication authenticating system 40 enables the computer system 14 to authenticate a first individual for communication with a second individual. To this extent, the communication authenticating system 40 is shown including a reject/accept system 42, a second communication medium information system 44, a message receiving system 46, an authenticating system 48, and a "blacklisting" system 50. Operation of each of these systems is discussed above. The communication authenticating system 40 may further include other system components 52 to provide additional or improved functionality to the communication authenticating system 40. It is understood that some of the various systems shown in FIG. 5 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for authenticating a first individual for communication with a second individual, it is understood that the invention further provides various alternative embodiments. For example, in one embodiment, the invention provides a computer-readable medium that includes computer program code to enable a computer infrastructure to authenticate a first individual for communication with a second individual. To this extent, the computer-readable medium includes program code, such as communication authenticating system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to authenticate a first individual for communication with a second individual, as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for authenticating a first individual for communication with a second individual. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of authenticating a first individual for communication with a second individual, the method comprising:
   receiving, on a first communication device, a first communication from the first individual via a first communication medium;
   rejecting the first communication;
   after rejecting the first communication, providing the first individual with information for communicating with the second individual via a second communication medium;
   receiving, on the first communication device or a second communication device, a second communication from the first individual via the second communication medium; and
   authenticating the first individual for communication with the second individual via at least one of the first and second communication medium.

2. The method of claim 1, wherein the first and second communication media are selected from a group consisting of: electronic mail, telephony, voice-over-Internet-protocol (VOIP) telephony, instant messaging (IM), and social network messaging.

3. The method of claim 2, wherein the first communication medium is electronic mail and the second communication medium is either telephony or VOIP telephony.

4. The method of claim 2, wherein the first communication medium is either telephony or VOIP telephony and the second communication medium is electronic mail.

5. The method of claim 1, further comprising:
   authenticating the first individual for communication with the second individual via at least one additional communication medium.

6. The method of claim 1, wherein authenticating the first individual for communication with the second individual requires that the second communication be received within a pre-determined period of the first individual being provided with the information for communicating with the second individual via the second communication medium.

7. The method of claim 1, wherein the information for communicating with the second individual via a second communication medium includes a reverse Turing test.

8. The method of claim 7, wherein the reverse Turing test is a Completely Automated Public Turing test to tell Computers and Humans Apart (CAPTCHA).

9. A system comprising:
   at least one computing device configured for authenticating a first individual for communication with a second individual by performing a method comprising:
   receiving a first communication from the first individual via a first communication medium;
   rejecting the first communication;
   after rejecting the first communication, providing the first individual with information for communicating with the second individual via a second communication medium;
   receiving a second communication from the first individual via the second communication medium; and
   authenticating the first individual for communication with the second individual via at least one of the first and second communication medium.

10. The system of claim 9, wherein the method further comprises:
    determining whether, based on either or both of the identity of the first individual or the content of the first communication, the first individual should not be authenticated for communication with the second individual.

11. The system of claim 9, wherein the method further comprises:
    determining whether, based on either or both of the identity of the first individual or the content of the first communication, the first individual should be authenticated for communication with the second individual.

12. The system of claim 9, wherein the first and second communication media are selected from a group consisting of: electronic mail, telephony, voice-over-Internet-protocol (VOIP) telephony, instant messaging (IM), and social network messaging.

13. The system of claim 9, wherein the information for communicating with the second individual via a second communication medium includes a reverse Turing test.

14. The system of claim 13, wherein the reverse Turing test is a Completely Automated Public Turing test to tell Computers and Humans Apart (CAPTCHA).

15. A program product stored on a non-transitory computer-readable storage medium, which when executed, is operable to authenticate a first individual for communication with a second individual by performing a method comprising:
    receiving a first communication from the first individual via a first communication medium;
    rejecting the first communication;
    after rejecting the first communication, providing the first individual with information for communicating with the second individual via a second communication medium;
    receiving a second communication from the first individual via the second communication medium; and
    authenticating the first individual for communication with the second individual via at least one of the first and second communication medium.

16. The program product of claim 15, wherein the first and second communication media are selected from a group consisting of: electronic mail, telephony, voice-over-Internet-protocol (VOIP) telephony, instant messaging (IM), and social network messaging.

17. The program product of claim 15, wherein the method further comprises:
    authenticating the first individual for communication with the second individual via at least one additional communication medium.

18. The program product of claim 15, wherein the information for communicating with the second individual via a second communication medium includes a reverse Turing test.

19. The program product of claim 18, wherein the reverse Turing test is a Completely Automated Public Turing test to tell Computers and Humans Apart (CAPTCHA).

20. A method for deploying an application for authenticating a first individual for communication with a second individual, comprising:
    providing a computer infrastructure being operable to:
    receive a first communication from the first individual via a first communication medium;
    reject the first communication;
    after the first communication is rejected, provide the first individual with information for communicating with the second individual via a second communication medium;

receive a second communication from the first individual via the second communication medium; and
authenticate the first individual for communication with the second individual via at least one of the first and second communication medium.

* * * * *